United States Patent [19]

Nakashima

[11] 4,258,549
[45] Mar. 31, 1981

[54] MASTER CYLINDER

[75] Inventor: Katsushi Nakashima, Chiryu, Japan

[73] Assignee: Aisin Seiki Co., Ltd., Kariya, Japan

[21] Appl. No.: 64,758

[22] Filed: Aug. 8, 1979

[30] Foreign Application Priority Data

Aug. 19, 1978 [JP] Japan .................................. 53-101056

[51] Int. Cl.³ .......................................... B60T 11/26
[52] U.S. Cl. ........................................ 60/588; 60/594
[58] Field of Search .................. 60/533, 578, 594, 588, 60/589, 585

[56] References Cited

U.S. PATENT DOCUMENTS

| | | | |
|---|---|---|---|
| 2,037,474 | 4/1936 | Loweke | 60/588 |
| 2,070,298 | 2/1937 | Schnell | 60/594 |
| 2,156,205 | 4/1939 | Swift | 60/588 |
| 2,311,787 | 2/1943 | Swift | 60/578 |
| 2,335,069 | 11/1943 | Loweke | 60/578 |
| 4,162,616 | 7/1979 | Hayashida | 60/594 |

Primary Examiner—Abraham Hershkovitz
Attorney, Agent, or Firm—Oblon, Fisher, Spivak, McClelland & Maier

[57] ABSTRACT

A master cylinder which is mainly adapted for a motorcycle and which is shortened in axial length in comparison with conventional master cylinders by eliminating a secondary cup for easy mounting on a handle-bar without interference with meters on the handle-bar.

4 Claims, 1 Drawing Figure

U.S. Patent    Mar. 31, 1981    4,258,549
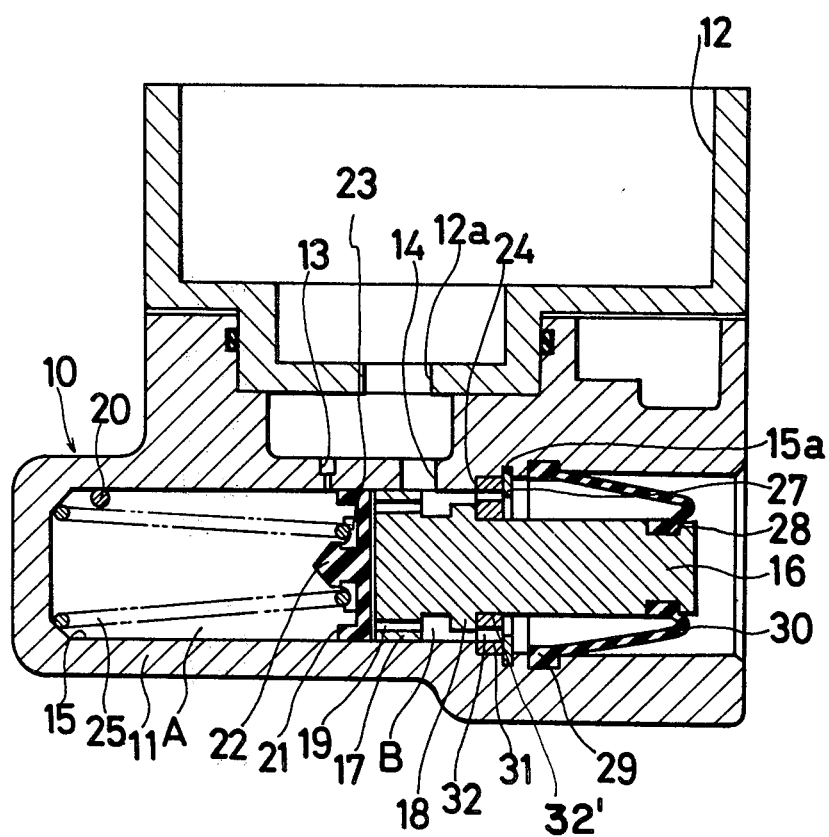

MASTER CYLINDER

BACKGROUND OF THE INVENTION

1. Field of the Invention

This invention relates to a master cylinder of a hydraulic brake system, and more particularly to a master cylinder which is mainly adapted for a motorcycle.

2. Description of the Prior Art

Various types of master cylinders have been proposed, one of which can be mounted on the handle-bar of the motorcycle. However, the handle-bar also mounts various meters and the length of the handle-bar has accordingly been shortened. Consequently, it is difficult to mount the master cylinder on the handle-bar without interference with the meters.

SUMMARY OF THE INVENTION

It is therefore one of the objects of this invention to provide a master cylinder which is shortened in axial length for easy mounting on the handle-bar.

It is another object of the invention to provide a master cylinder in which a piston fitted within the master cylinder is not provided with a secondary cup to thereby shorten the axial length of the master cylinder.

BRIEF DESCRIPTION OF THE DRAWINGS

Various objects, features and attendant advantages of the present invention will be more fully appreciated as the same becomes better understood from the following detailed description when considered in connection with the accompanying drawing wherein:

The single FIGURE is a longitudinal cross section of the preferred embodiment of a master cylinder according to this invention.

DETAILED DESCRIPTION OF THE PREFERRED EMBODIMENT

Referring now to the drawing, there is illustrated a master cylinder 10 having a main body 11. The main body 11 is provided with a blind bore 15 therein and is coupled fluid-tightly with a reservoir 12 with a hole 12a at the bottom portion thereof. In the bore 15, there is slidably mounted a piston 16 for reciprocation and the piston 16 is provided with an annular flange 17 having a plurality of axial passages 19 at the forward end thereof.

Between a closed wall of the bore 15 and the flange 17 of the piston 16 there is formed a first fluid chamber A which is in fluid communication with rear wheel cylinders (not shown) via an outlet 20. The first fluid chamber A is also in fluid communication with the reservoir 12 through a compensating port 13 and the hole 12a.

A primary cup 21 is secured to the flange 17 of the piston 16 to close the compensating port 13 in accordance with the forward stroke of the piston 16. The primary cup 21 is provided with a projection 22 at the central portion thereof and a retainer 23 is disposed around the projection 22. A compression spring 25 is interposed between the closed wall of the bore 15 and the retainer 23 so as to urge the piston rearwardly.

The piston 16 is slidably passed through a sleeve 31 having a central axial passage 32' and a plurality of axial passages 32 and is provided with an annular outer groove 28 at the rear end thereof. In the groove 28 there is fluid-tightly fitted one end of a flexible boot 30 and the other end thereof is fluid-tightly fitted in an annular inner groove 29 of the bore 15. Thus, a second fluid chamber B is formed between the boot 30 and the flange 17 of the piston 16 and is always in fluid communication with the reservoir 12 through a supply port 14.

The sleeve 31 is engaged with a stepped portion 24 of the bore 15 and a snap ring 27 which is fitted in a groove 15a of the bore 15 to prevent the sleeve 31 from moving together with the piston 16. The piston 16 is also provided with an annular projection 18 which is engageable with the sleeve 31 to limit the original position of the piston 16. Furthermore, the piston 16 is operatively connected to a link mechanism having a lever (not shown).

In operation, when the lever is rotated to move the piston 16 forwardly, the primary cup 21 closes the compensating port 13 to generate fluid pressure in the first fluid chamber A. During forward movement of the piston 16, fluid pressure is transmitted to the wheel cylinders for braking.

When the lever is released, the spring 25 returns the piston 16 to its original position. During the return stroke (i.e. rearward stroke) of the piston 16, a vacuum is momentarily developed in the first fluid chamber A so that fluid will be supplied from the reservoir 12 into the first fluid chamber A through the hole 12a, the supply port 14, the axial passages 19 and the clearance between the primary cup 21 and the bore 15. When the piston 16 is returned to its original or retracted position from an actuated position, any oversupply of fluid in the chamber B will return to the reservoir 12 through the supply port 14 and the hole 12a.

As mentioned above, in the master cylinder 10 of the present invention the piston 16 is not carried with a secondary cup thereon. On the contrary, in a conventional master cylinder the piston is carried with a secondary cup thereon and the distance between the secondary cup and a supply port is longer than the full stroke of the piston. Consequently, the axial length of the master cylinder 10 according to this invention may be shortened in comparison with conventional master cylinders.

In addition, it is a matter of course that the master cylinder 10 may be adapted for automotive vehicles.

Obviously many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A master cylinder comprising:
   a main body having a blind bore and a stepped bore portion formed therein;
   a reservoir fluid-tightly communicating with said main body;
   a piston slidably fitted within said blind bore for movement between a retracted position and an actuated position and including an annular projection extending therefrom;
   a first fluid chamber formed between said piston and a closed wall of said blind bore;
   said main body including a compensation port formed therein through which said first fluid chamber is in fluid communication with said reservoir;

a primary cup secured to said piston to close fluid communication of said compensation port to said bore;

a spring disposed between said closed wall of said bore and said primary cup;

a flexible boot member, one end of which is fluid-tightly fixed to said main body, the other end of which is fluid-tightly fixed to said piston, said boot member and said piston forming a second fluid chamber therebetween;

said main body also including a supply port formed therein through which said second fluid chamber is in constant fluid communication with said reservoir; and a sleeve engageable with said stepped bore portion for limiting the movement of said piston and having an axial passage formed therein, wherein said piston is slidably mounted within said axial passage formed in said sleeve and wherein said annular projection is engageable with said sleeve so as to limit the retracted position of said piston and wherein said sleeve includes at least one passage formed therein to provide fluid communication from said supply port to said second fluid chamber.

2. A master cylinder as set forth in claim 1, wherein said main body includes a groove formed therein and further comprises a snap ring member disposed in said groove for engaging said sleeve.

3. A master cylinder as set forth in claim 1, said piston further comprising a flange formed adjacent said primary cup and wherein said annular projection is positioned between said flange and said sleeve.

4. A master cylinder as set forth in claim 1, said primary cup extending completely across said blind bore of said main body.

* * * * *